(12) United States Patent
Yasumura

(10) Patent No.: US 6,366,476 B1
(45) Date of Patent: Apr. 2, 2002

(54) SWITCHING POWER SUPPLY APPARATUS WITH ACTIVE CLAMP CIRCUIT

(75) Inventor: Masayuki Yasumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/855,247

(22) Filed: May 15, 2001

(30) Foreign Application Priority Data

May 30, 2000 (JP) ...................................... P2000-164768
May 17, 2000 (JP) ...................................... P2000-149815

(51) Int. Cl.$^7$ .......................................... H02M 3/335
(52) U.S. Cl. ................................ 363/21.02; 363/21.04; 363/97
(58) Field of Search ................................ 363/20, 21.01, 363/21.02, 21.04, 21.08, 95, 97, 131

(56) References Cited

U.S. PATENT DOCUMENTS 3,742,371 A * 6/1973 Seibt et al. ..................... 363/18
5,451,750 A * 9/1995 An ................................ 363/97
5,973,937 A * 10/1999 Yasumura ..................... 363/19
5,973,946 A * 10/1999 Yasumura ..................... 363/89
5,991,171 A * 11/1999 Cheng ....................... 363/21.03

* cited by examiner

*Primary Examiner*—Adolf Deneke Berhane
(74) *Attorney, Agent, or Firm*—Jay H. Maioli

(57) ABSTRACT

An active clamp circuit is provided on the primary side of a complex resonance type switching converter having a voltage resonance type converter on the primary side and a parallel resonant circuit on the secondary side. The active clamp circuit clamps a parallel resonance voltage pulse generated across a primary-side parallel resonant capacitor to thereby suppress the level of the parallel resonance voltage pulse. Thus, products having low withstand voltage may be selected for components such as switching devices and the primary-side parallel resonant capacitor provided in the power supply circuit. An auxiliary switching device Q2 of the active clamp circuit is driven by a self-oscillation circuit formed by winding a wire of the primary winding of an insulating converter transformer by one turn. Thus, the circuit system for driving the active clamp circuit is simplified, thereby improving power conversion efficiency and miniaturizing the power supply circuit.

4 Claims, 12 Drawing Sheets

F I G. 5
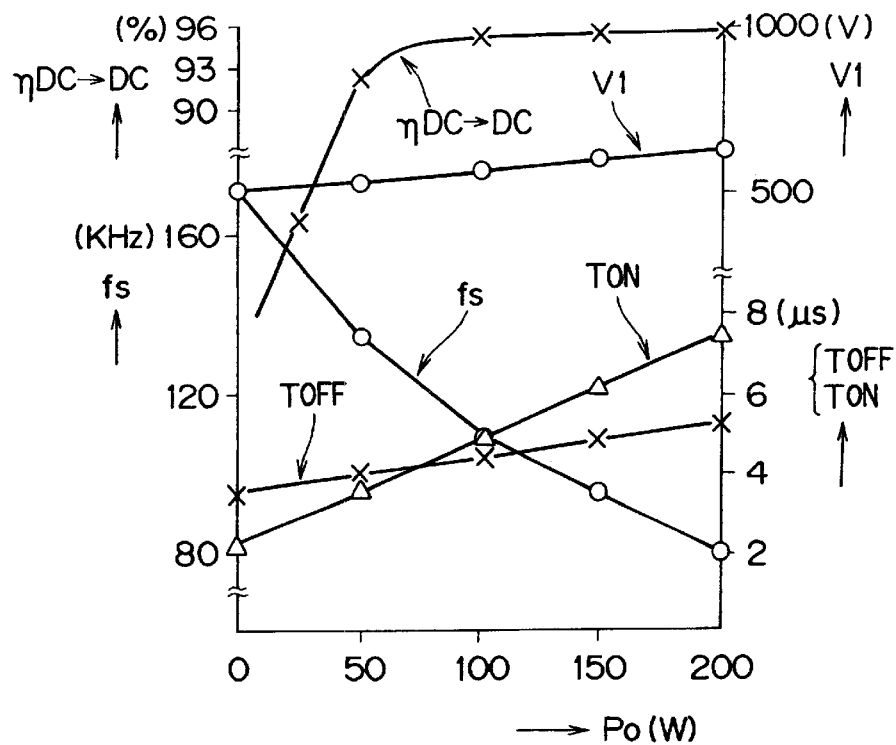
F I G. 6
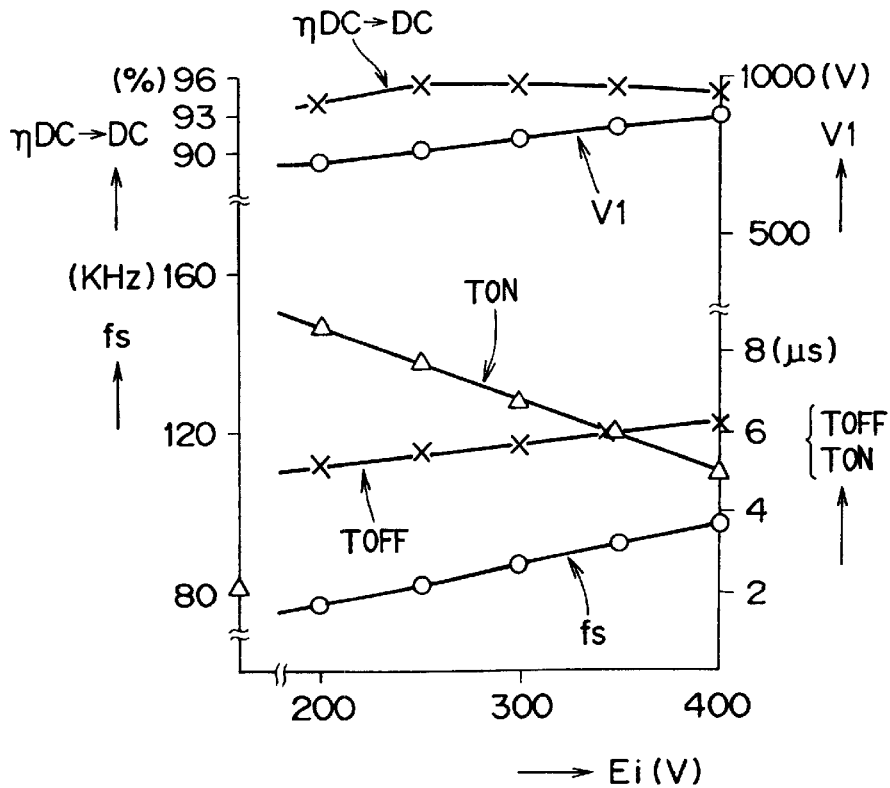

PIT

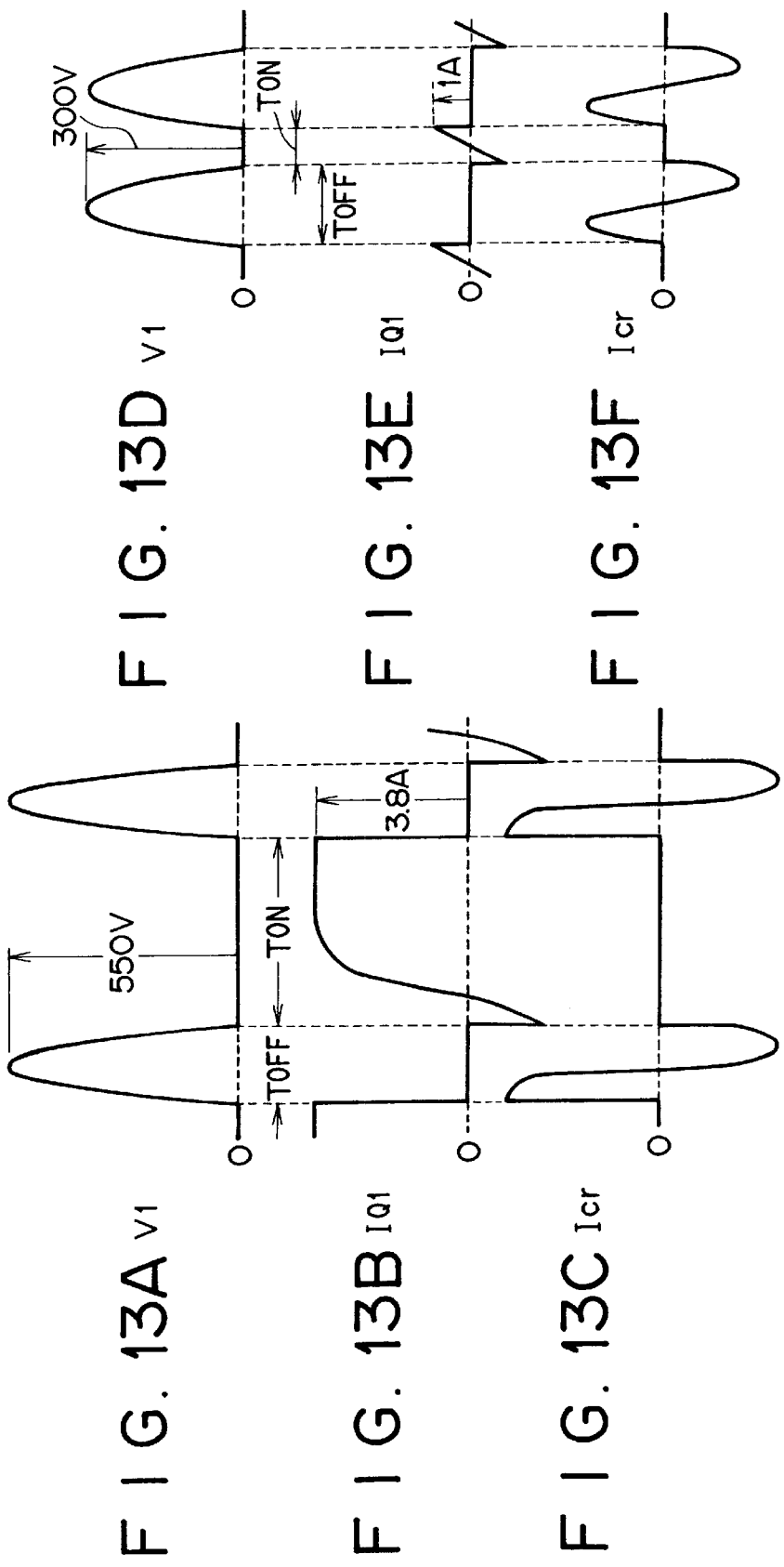

SWITCHING POWER SUPPLY APPARATUS WITH ACTIVE CLAMP CIRCUIT

BACKGROUND OF THE INVENTION

The present invention relates to a switching power supply circuit to be provided as a power supply for various electronic apparatus.

Switching power supply circuits employing switching converters such as flyback converters and forward converters are widely known. These switching converters form a rectangular waveform in switching operation, and therefore there is a limit to suppression of switching noise. It is also known that because of their operating characteristics, there is a limit to improvement of power conversion efficiency.

Hence, there have been proposed various switching power supply circuits formed by various resonance type converters that make it possible to readily obtain high power conversion efficiency and to achieve low noise by forming a sinusoidal waveform in switching operation. The resonance type converters have another advantage of being able to be formed by a relatively small number of parts.

FIGS. 9 and 10 are circuit diagrams each showing an example of a prior art switching power supply circuit employing a resonance type converter.

This voltage resonance type converter is externally excited, and a MOS-FET, for example, is used as a switching device Q1.

A capacitor Cr is connected in parallel with a drain and a source of the switching device Q1. Capacitance of the capacitor Cr and leakage inductance obtained at a primary winding N1 of an isolating converter transformer PIT form a voltage resonant circuit. The parallel resonant circuit performs resonant operation according to switching operation of the switching device Q1.

A clamp diode (so-called body diode) DD is connected in parallel with the drain and source of the switching device Q1. The clamp diode DD forms a path of clamp current that flows during an off period of the switching device.

The drain of the switching device Q1 is connected to an oscillating circuit 11 in a switching driver 10. An output of the drain supplied to the oscillating circuit 11 is used to variably control an on period of switching operation of the switching device Q1 in switching frequency control.

The switching device Q1 is driven for switching operation by the switching driver 10 which is formed by integrating the oscillating circuit 11 and a driving circuit 12, and the switching frequency of the switching device Q1 is variably controlled for the purpose of constant-voltage control. Incidentally, the switching driver 10 in this case is provided as a single integrated circuit, for example.

The switching driver 10 is connected to a line of rectified and smoothed voltage Ei via a starting resistance Rs. The switching driver 10 starts operation by being supplied with power supply voltage via the starting resistance Rs at the start of power supply, for example.

The oscillating circuit 11 in the switching driver 10 performs oscillating operation to generate and output an oscillating signal. The driving circuit 12 converts the oscillating signal into a driving voltage, and then outputs the driving voltage to a gate of the switching device Q1. Thus, the switching device Q1 performs switching operation according to the oscillating signal generated by the oscillating circuit 11. Therefore, the switching frequency and duty ratio of an on/off period within one switching cycle of the switching device Q1 are determined depending on the oscillating signal generated by the oscillating circuit 11.

The oscillating circuit 11 changes frequency fs of the oscillating signal on the basis of the level of a secondary-side direct-current output voltage E0 inputted via a photocoupler 30. The oscillating circuit 11 changes the switching frequency fs and at the same time, controls the waveform of the oscillating signal in such a manner that a period TOFF during which the switching device Q1 is turned off is fixed and a period TON during which the switching device Q1 is turned on is changed. The period TON is variably controlled on the basis of the level of a switching resonance pulse voltage V1 across the parallel resonant capacitor Cr.

As a result of such operation of the oscillating circuit 11, the secondary-side direct-current output voltage E0 is stabilized.

The isolating converter transformer PIT transmits switching output of the switching device Q1 to the secondary side of the switching power supply circuit.

As shown in FIG. 11, the isolating converter transformer PIT has an E-E-shaped core formed by combining E-shaped cores CR1 and CR2 made for example of a ferrite material in such a manner that magnetic legs of the core CR1 are opposed to magnetic legs of the core CR2. A gap G is formed in a central magnetic leg of the E-E-shaped core in a manner as shown in the figure, and a primary winding N1 and a secondary winding N2 are wound around the central magnetic leg in a state in which the windings are divided from each other by using a dividing bobbin B. Thus, a state of loose coupling at a required coupling coefficient, for example $k \approx 0.85$ is obtained between the primary winding N1 and the secondary winding N2, and because of the looseness of the coupling, a saturated state is not readily obtained.

The gap G can be formed by making the central magnetic leg of each of the E-shaped cores CR1 and CR2 shorter than two outer legs of each of the E-shaped cores CR1 and CR2.

As shown in FIGS. 9 and 10, an ending point of the primary winding N1 of the isolating converter transformer PIT is connected to the drain of the switching device Q1, while a starting point of the primary winding N1 is connected to the rectified and smoothed voltage Ei. Hence, the primary winding N1 is supplied with the switching output of the switching device Q1, whereby an alternating voltage whose cycle corresponds to the switching frequency of the switching device Q1 occurs in the primary winding N1.

The alternating voltage induced by the primary winding N1 occurs in the secondary winding N2 on the secondary side of the isolating converter transformer PIT. In FIG. 9, a secondary-side parallel resonant capacitor C2 is connected in parallel with the secondary winding N2, and in FIG. 10, a secondary-side series resonant capacitor C2 is connected in series with the secondary winding N2. Therefore leakage inductance L2 of the secondary winding N2 and capacitance of the secondary-side parallel or series resonant capacitor C2 form a resonant circuit. The resonant circuit converts the alternating voltage induced in the secondary winding N2 into a resonance voltage, whereby voltage resonance operation is obtained on the secondary side.

The power supply circuit is provided with the parallel resonant circuit to convert switching operation into voltage resonance type operation on the primary side, and the parallel or series resonant circuit to provide voltage resonance operation on the secondary side. In the present specification, the switching converter provided with resonant circuits on the primary side and the secondary side as described above is referred to as a "complex resonance type switching converter."

A rectifying and smoothing circuit comprising a bridge rectifier circuit DBR and a smoothing capacitor C0 is provided on the secondary side of the power supply circuit, whereby a secondary-side direct-current output voltage E0 is obtained. In the power supply circuit of FIG. 9, full-wave rectifying operation is provided by the bridge rectifier circuit DBR on the secondary side. In this case, the bridge rectifier circuit DBR is supplied with the resonance voltage by the secondary-side parallel resonant circuit, and then generates the secondary-side direct-current output voltage E0 whose level is substantially equal to that of the alternating voltage induced in the secondary winding N2. In the power supply circuit of FIG. 10, two rectifier diodes D01 and D02 are connected in a manner shown in the figure, and therefore the rectifier circuit on the secondary side forms a voltage doubler rectifier circuit. Thus, the rectifier circuit on the secondary side provides a secondary-side direct-current output voltage E0 that has a level twice that of the alternating voltage obtained in the secondary winding N2.

The secondary-side direct-current output voltage E0 is also inputted to the oscillating circuit 11 in the switching driver 10 on the primary side via the photocoupler 30 insulating the primary side from the secondary side.

As for secondary-side operation of the isolating converter transformer PIT, mutual inductance M between inductance L1 of the primary winding N1 and inductance L2 of the secondary winding N2 becomes +M or −M, depending on polarity (winding direction) of the primary winding N1 and the secondary winding N2, a connected relation between the rectifier diodes D01 and D02, and change in polarity of the alternating voltage induced in the secondary winding N2.

For example, an equivalent of a circuit shown in FIG. 12A has a mutual inductance of +M, while an equivalent of a circuit shown in FIG. 12B has a mutual inductance of −M.

This will be applied to the secondary-side operation of the isolating converter transformer PIT shown in FIG. 9 or FIG. 10. When the alternating voltage obtained at the secondary winding N2 has a positive polarity, an operation that causes rectified current to flow in the bridge rectifier circuit DBR can be considered a +M operation mode, or forward operation, whereas when the alternating voltage obtained at the secondary winding N2 has a negative polarity, an operation that causes rectified current to flow in the bridge rectifier diode DBR can be considered a −M operation mode, or flyback operation. Every time the alternating voltage obtained at the secondary winding N2 becomes positive or negative, the operation mode of the mutual inductance becomes +M or −M, respectively.

With such a configuration, power increased by effects of the primary-side parallel resonant circuit and the secondary-side parallel resonant circuit is supplied to a load side, and accordingly the power supplied to the load side is increased as much, thereby improving a rate of increase of maximum load power.

This is achieved because the primary winding N1 and the secondary winding N2 are wound in a state in which the windings are divided from each other to be loosely coupled to each other in the isolating converter transformer PIT, and thereby a saturated state is not readily obtained.

Stabilizing operation of the circuit shown in FIG. 9 or FIG. 10 is as follows.

As described above, the oscillating circuit 11 in the switching driver 10 on the primary side is supplied with the secondary-side direct-current output voltage E0 via the photocoupler 30. The oscillating circuit 11 changes the frequency of the oscillating signal for output according to change in the level of the supplied secondary-side direct-current output voltage E0. This means an operation of changing the switching frequency of the switching device Q1. Thus, resonance impedance of the primary-side voltage resonance type converter and the isolating converter transformer PIT is changed, and accordingly energy transmitted to the secondary side of the isolating converter transformer PIT is also changed. As a result, the secondary-side direct-current output voltage E0 is controlled so as to remain constant at a required level. This means that the power supply is stabilized.

When the oscillating circuit 11 of the power supply circuit shown in FIG. 9 or FIG. 10 changes the switching frequency, the period TOFF during which the switching device Q1 is turned off is fixed and the period TON during which the switching device Q1 is turned on is variably controlled. Specifically, by variably controlling the switching frequency as an operation for constant-voltage control, the power supply circuit controls the resonance impedance for switching output, and at the same time, controls the conduction angle of the switching device within a switching cycle. This complex control operation is realized by a single control circuit system.

FIGS. 13A, 13B, 13C, 13D, 13E, and 13F are waveform diagrams showing operation of the primary-side voltage resonance type converters in the power supply circuits shown in FIG. 9 and FIG. 10. FIGS. 13A, 13B, and 13C each show operation of the primary-side voltage resonance type converters at an alternating input voltage VAC=100 V and a maximum load power Pomax=200 W. FIGS. 13D, 13E, and 13F each show operation of the primary-side voltage resonance type converters at an alternating input voltage VAC= 100 V and a minimum load power Pomin=0 W, or no load.

When the switching device Q1 performs switching operation, the primary-side parallel resonant circuit performs resonant operation during the period TOFF during which the switching device Q1 is turned off. Thus, as shown in FIGS. 13A and 13D, the parallel resonance voltage V1 across the parallel resonant capacitor Cr forms a sinusoidal resonance pulse waveform during the period TOFF.

The parallel resonant operation performed during the period TOFF causes a parallel resonance current Icr to flow through the parallel resonant capacitor Cr so as to form a substantially sinusoidal waveform and change from a positive direction to a negative direction during the period TOFF, as shown in FIGS. 13C and 13F.

A comparison of FIG. 13A with FIG. 13D indicates that the switching frequency fs is controlled so as to rise as load power Po is decreased, and the switching frequency fs is changed while fixing the period TOFF at a constant length and changing the period TON, during which the switching device Q1 is turned on.

The voltage resonance type converters formed as shown in FIGS. 9 and 10 change the level of the parallel resonance voltage V1 according to variation in load power. For example, the parallel resonance voltage V1 is 550 V at a maximum load power Pomax=200 W. whereas the parallel resonance voltage V1 becomes 300 V at a minimum load power Pomin=0 W. This means that the parallel resonance voltage V1 has a tendency to rise as the load power becomes heavier.

As shown in FIGS. 13B and 13E, a switching output current IQ1 flowing through the drain or the collector of the switching device Q1 is at a zero level during the period TOFF, and flows in a manner shown by the waveforms of FIGS. 13B and 13E during the period TON. The level of the switching output current IQ1 also has a tendency to rise as the load power Po becomes heavier. For example, according to FIGS. 13B and 13E, the switching output current IQ1 is 3.8 A at a maximum load power Pomax=200 W, whereas the switching output current IQ1 is 1 A at a minimum load power Pomin=0 W.

As characteristics of the power supply circuits shown in FIGS. 9 and 10, FIG. 14 shows characteristics of variations in the switching frequency fs, the period TOFF and the period TON within a switching cycle, and the parallel resonance voltage V1 with respect to the alternating input voltage VAC at a maximum load power Pomax=200 W.

As shown in the figure, the switching frequency fs is changed within a range of fs=110 KHz to 140 KHz for the alternating input voltage VAC=90 V to 140 V. This means an operation of stabilizing variation in the secondary-side direct-current output voltage E0 according to variation in direct-current input voltage. As for variation in the alternating input voltage VAC, the switching frequency is controlled so as to rise as the level of the alternating input voltage VAC is increased.

As for the period TOFF and the period TON within one switching cycle, the figure shows that the period TOFF is constant, as contrasted with the switching frequency fs, whereas the period TON is shortened as the switching frequency fs is increased.

The parallel resonance voltage V1 also changes according to variation in the commercial alternating-current power VAC; the level of the parallel resonance voltage V1 rises as the alternating input voltage VAC is increased.

SUMMARY OF THE INVENTION

The power supply circuits as shown in FIGS. 9 and 10 configured to stabilize the secondary-side direct-current output voltage by the complex control method change the peak level of the parallel resonance voltage V1 according to load conditions and variation in the alternating input voltage VAC, as is shown in FIGS. 13A to 13F and FIG. 14. When the level of the alternating input voltage VAC as the 100-V commercial alternating-current power AC for example rises to 140 V under conditions of a heavy load approximating the maximum load power, in particular, the parallel resonance voltage V1 rises to 700 V at the maximum, as shown in FIG. 14.

Therefore, for a commercial alternating-current power AC of 100 V, products having a withstand voltage of 800 V need to be selected for the parallel resonant capacitor Cr and the switching device Q1, which are supplied with the parallel resonance voltage V1, while for a commercial alternating-current power AC of 200 V, products having a withstand voltage of 1200 V need to be selected for the parallel resonant capacitor Cr and the switching device Q1. This results in increases in size and cost of the parallel resonant capacitor Cr and the switching device Q1.

In addition, switching characteristics of the switching device are degraded as its withstand voltage becomes higher. Thus, a product having a high withstand voltage selected for the switching device Q1 as described above increases power loss due to switching operation, and also reduces power conversion efficiency.

In view of the problems described above, it is an object of the present invention to miniaturize and improve power conversion efficiency in the switching power supply circuit configured as a complex resonance type switching converter.

According to the present invention, there is provided a switching power supply circuit comprised as follows.

The switching power supply circuit according to the present invention comprises a switching means including a main switching device for interrupting an inputted direct-current input voltage for output, a primary-side parallel resonant capacitor for forming a primary-side parallel resonant circuit that converts operation of the switching means into voltage resonance type operation, and an insulating converter transformer having a primary-side winding and a secondary-side winding for transmitting an output of the switching means obtained in the primary-side winding to the secondary-side winding, the primary-side winding and the secondary-side winding being wound so as to be loosely coupled to each other at a required coupling coefficient.

The switching power supply circuit on the secondary side comprises a secondary-side resonant circuit formed by connecting a secondary-side resonant capacitor to the secondary-side winding, and a direct-current output voltage generating means for rectifying an alternating voltage inputted from the secondary-side winding and thereby providing a direct-current output voltage.

The switching power supply circuit is characterized by further including an active clamp means for clamping a primary-side parallel resonance voltage generated across the primary-side parallel resonant capacitor during an off period of the main switching device, the active clamp means including an auxiliary switching device driven for switching operation by self-oscillation driving, and a switching driving means for effecting control for constant voltage by driving the main switching device for switching operation such that switching frequency of the main switching device is variably controlled according to level of the direct-current output voltage and an on/off period of the main switching device within one switching cycle is changed.

The configuration on the primary side described above allows the active clamp means to clamp the parallel resonance voltage generated during the off period of the main switching device to thereby suppress the resonance voltage. Therefore, products having lower withstand voltage may be used for components such as the switching devices and the primary-side parallel resonant capacitor provided in the power supply circuit.

Moreover, the active clamp means is driven by a self-oscillation driving circuit of simple configuration that includes a driving winding formed by winding a wire of the primary-side winding of the insulating converter transformer. Therefore, the active clamp means requires only a small number of parts, and thus greatly contributes to miniaturization of the power supply circuit in particular.

BRIEF DESCRIPTION OF THE DRAWINGS

FIG. 5 is a characteristic diagram showing power conversion efficiency, switching frequency, and a period TON/

Figure 7:
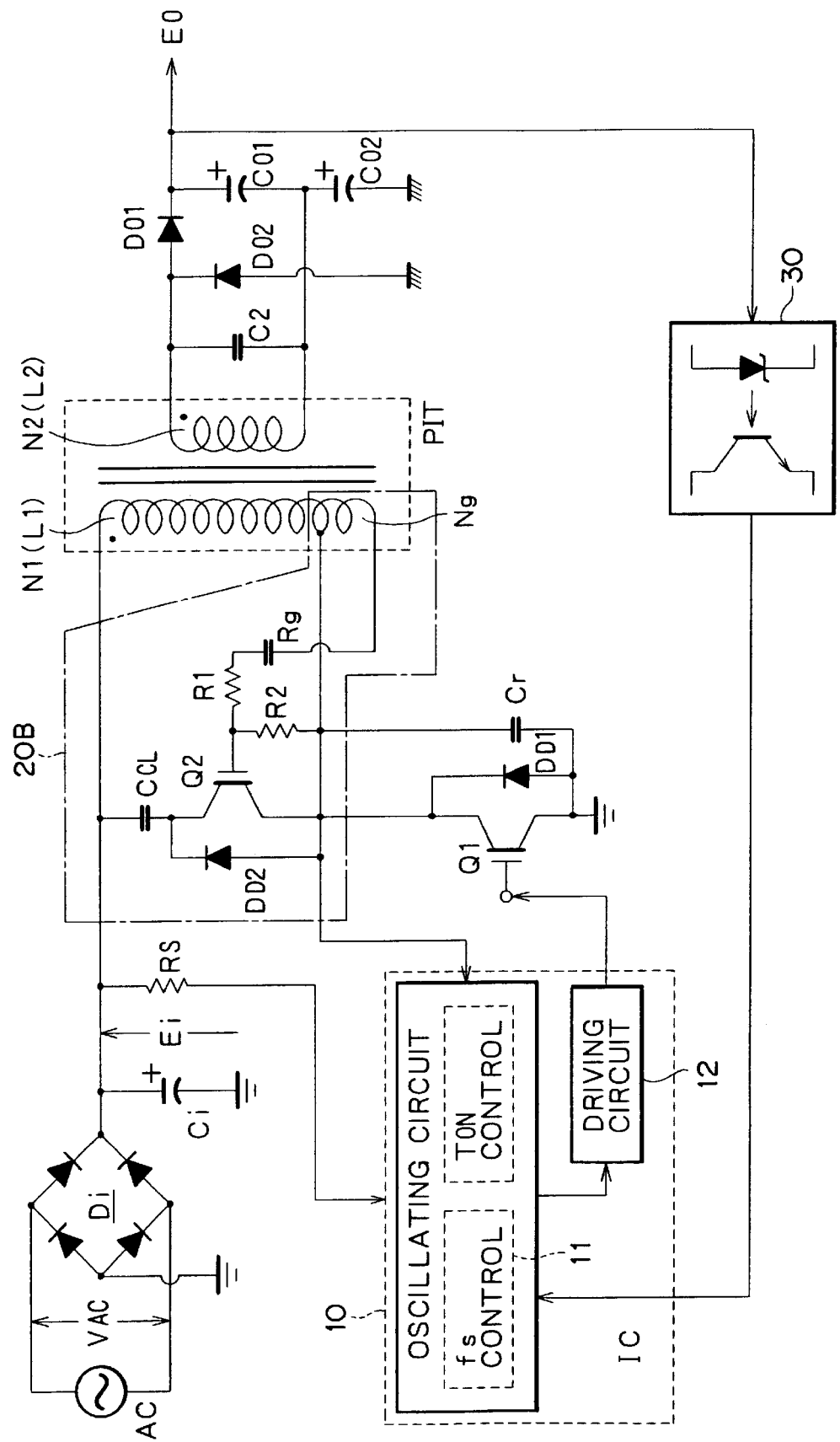
Figure 8:
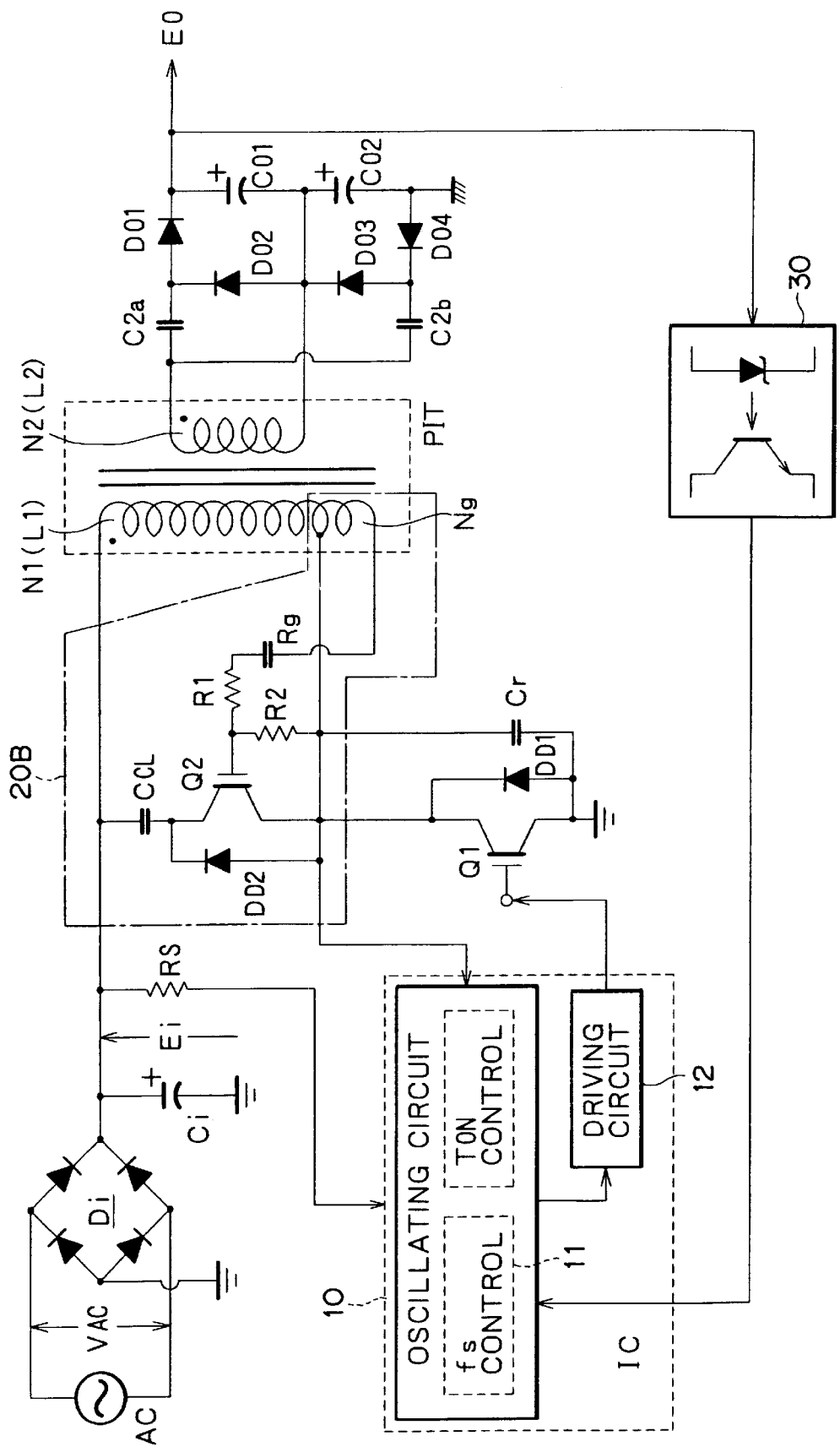
Figure 9:
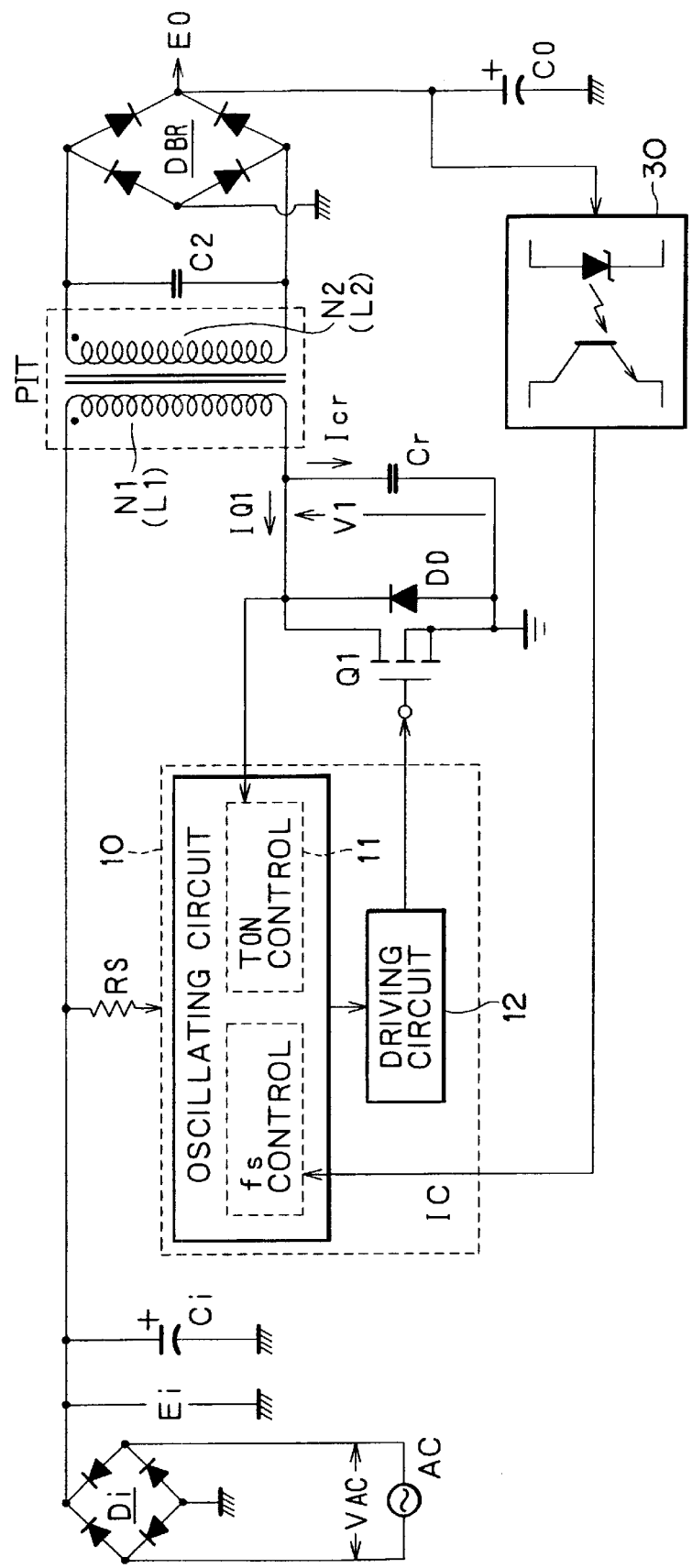
Figure 10:
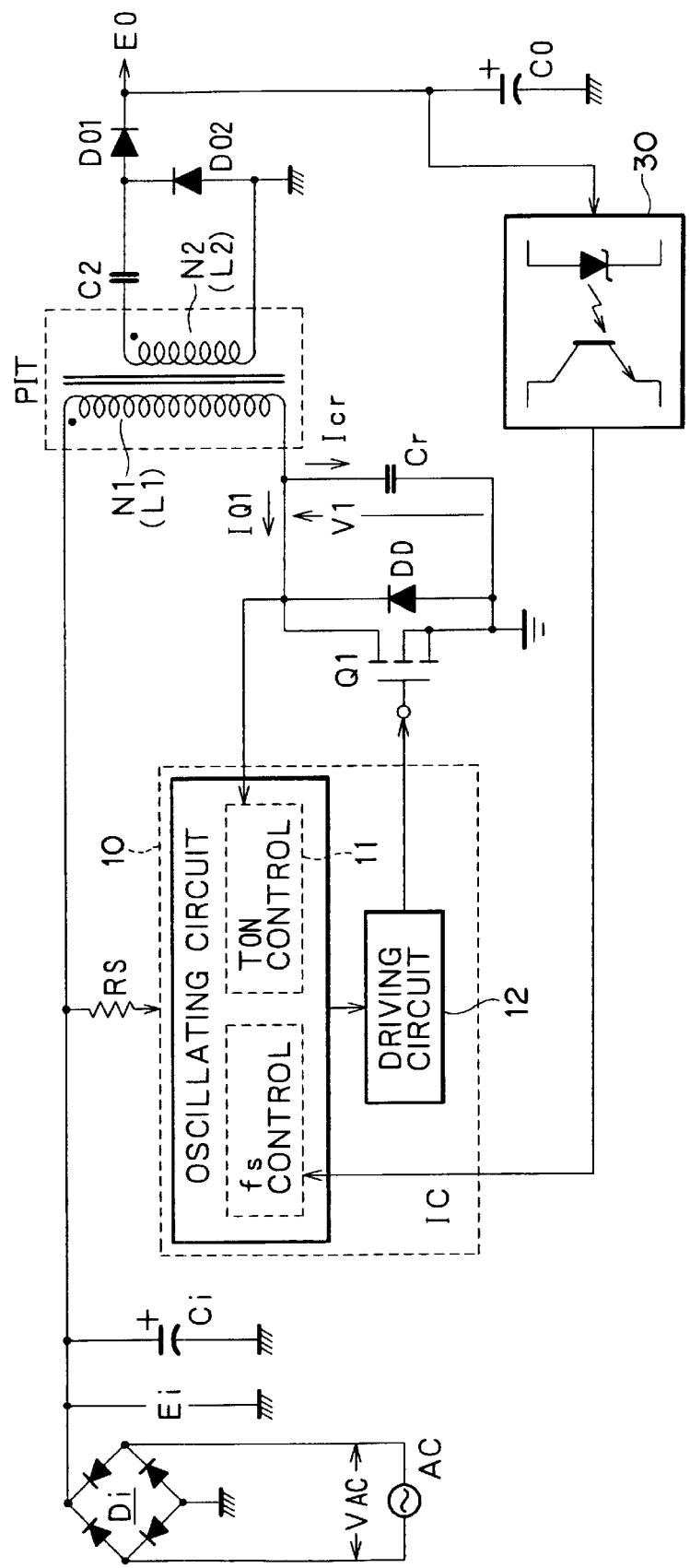
Figure 11:
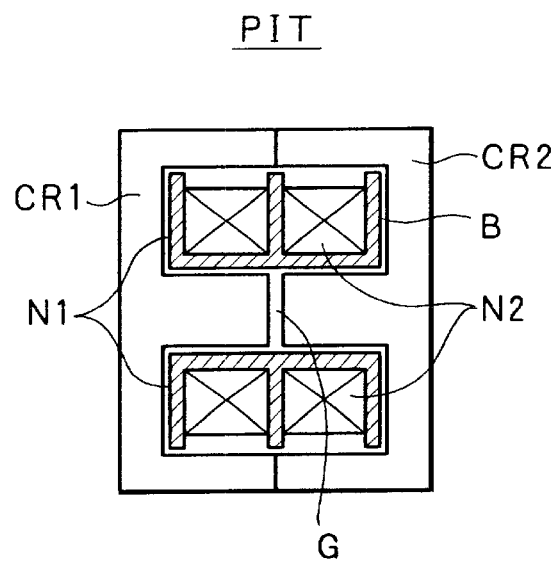
Figure 12A:
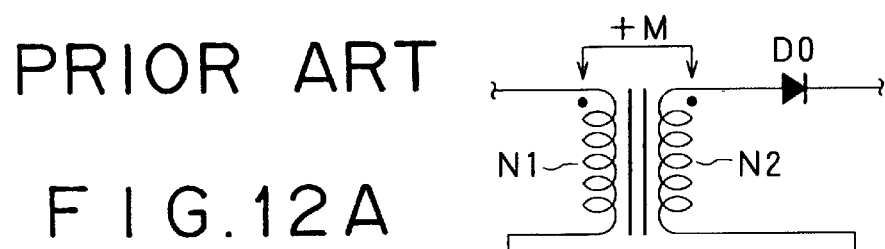
Figure 12B:
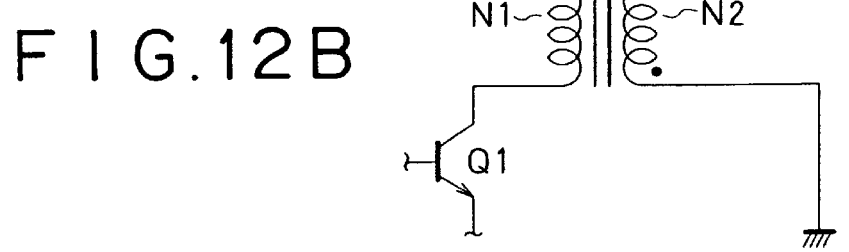
Figure 14:
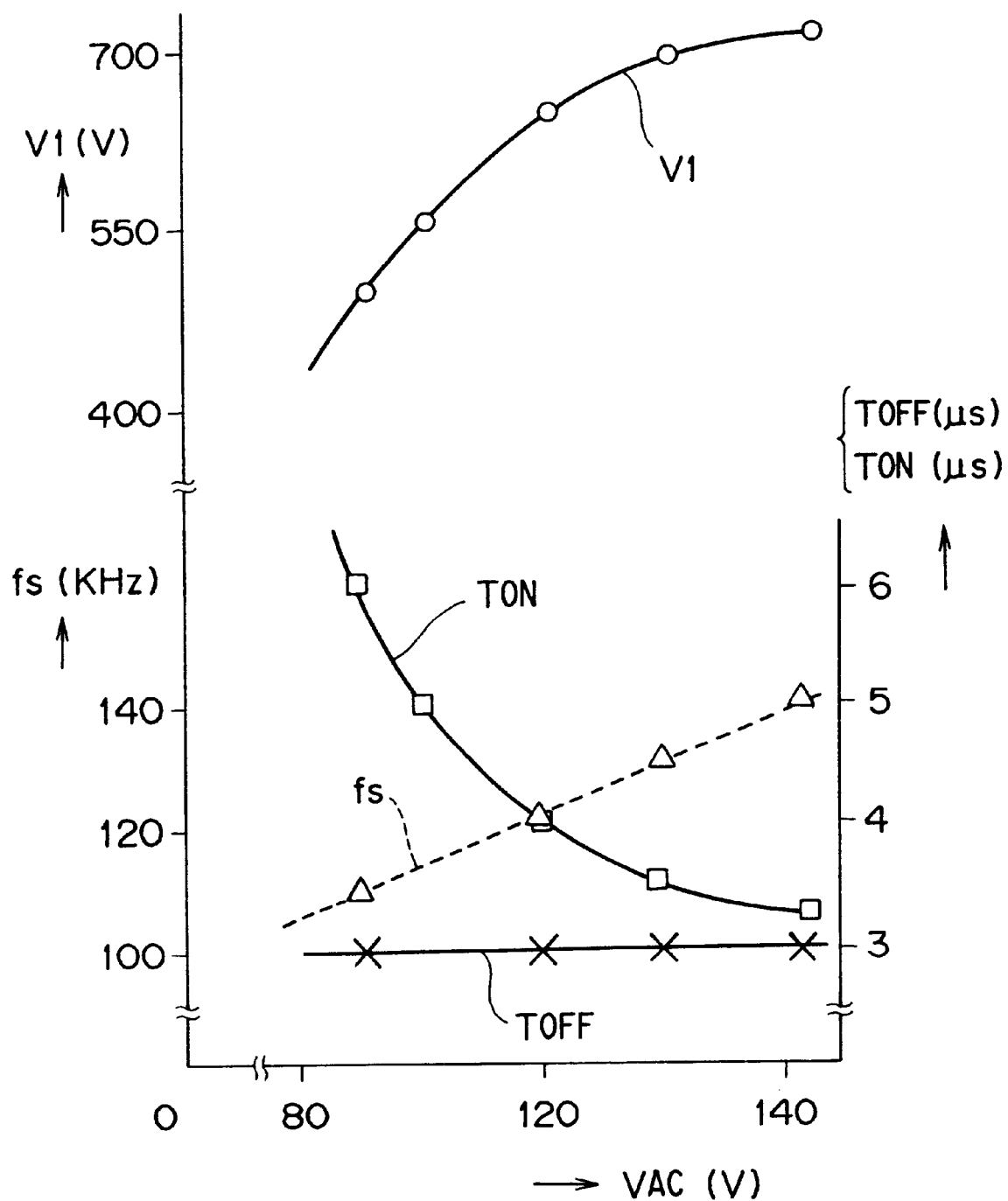

TOFF with respect to load power as characteristics of the switching power supply circuit according to the first and second embodiments of the present invention;

FIG. 6 is a characteristic diagram showing power conversion efficiency, switching frequency, and a period TON/TOFF with respect to input voltage as characteristics of the switching power supply circuit according to the first and second embodiments of the present invention;

FIG. 7 is a circuit configuration diagram of a switching power supply circuit according to a third embodiment of the present invention;

FIG. 8 is a circuit configuration diagram of a switching power supply circuit according to a fourth embodiment of the present invention;

FIG. 9 is a circuit diagram showing a configuration example of a prior art switching power supply circuit;

FIG. 10 is a circuit diagram showing another configuration example of a prior art switching power supply circuit;

FIG. 11 is a sectional view of an insulating converter transformer;

FIGS. 12A and 12B are equivalent circuit diagrams of assistance in explaining operations when mutual inductance is +M and −M;

FIGS. 13A, 13B, 13C, 13D, 13E, and 13F are waveform diagrams showing operation of a prior art switching power supply circuit; and FIG. 14 is a diagram of assistance in explaining characteristics of the prior art switching power supply circuit with respect to alternating input voltage.

DETAILED DESCRIPTION OF THE INVENTION

Figure 1:
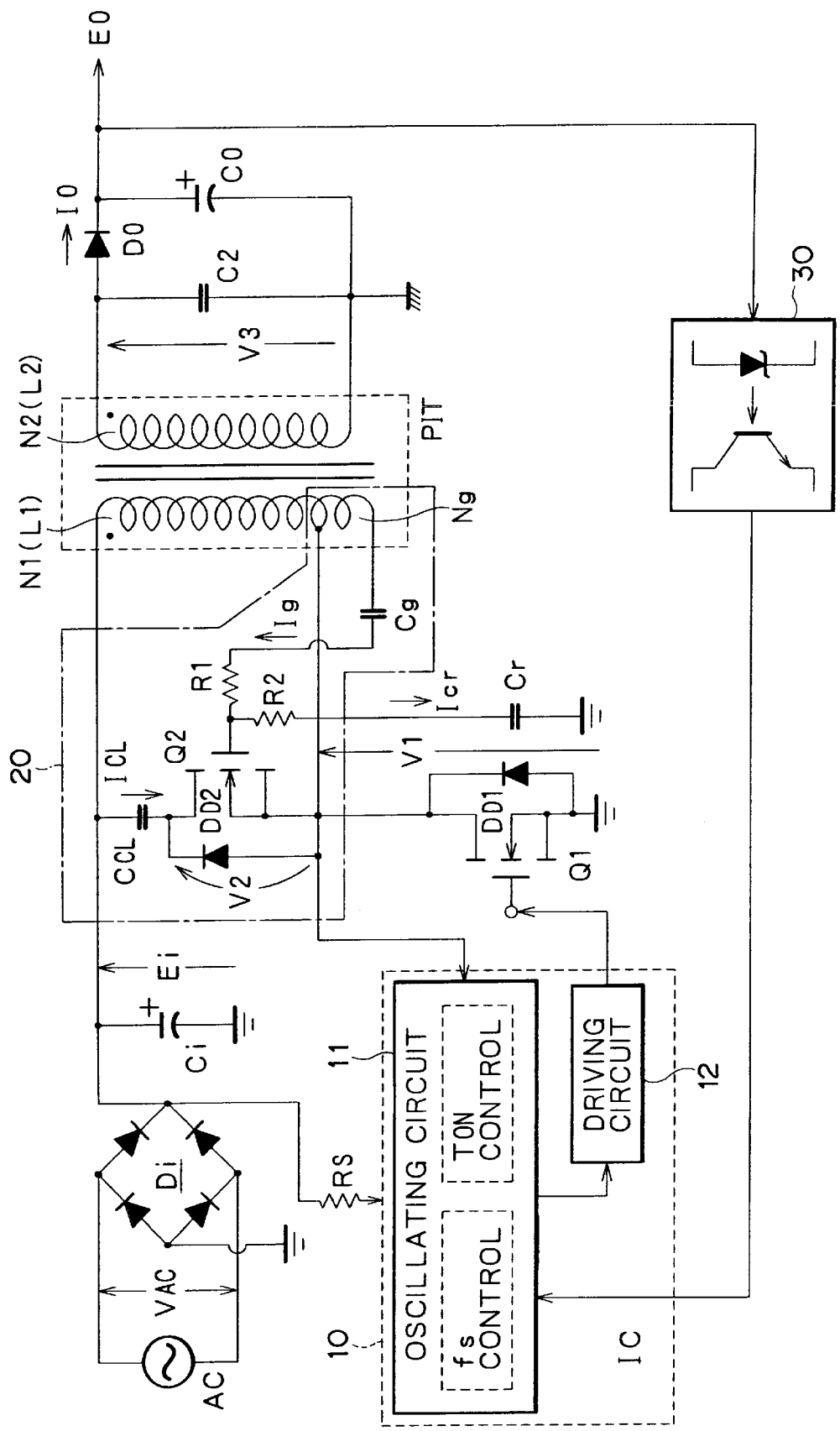
FIG. 1 is a circuit configuration diagram of a switching power supply circuit according to a first embodiment of the present invention.
Figure 3:
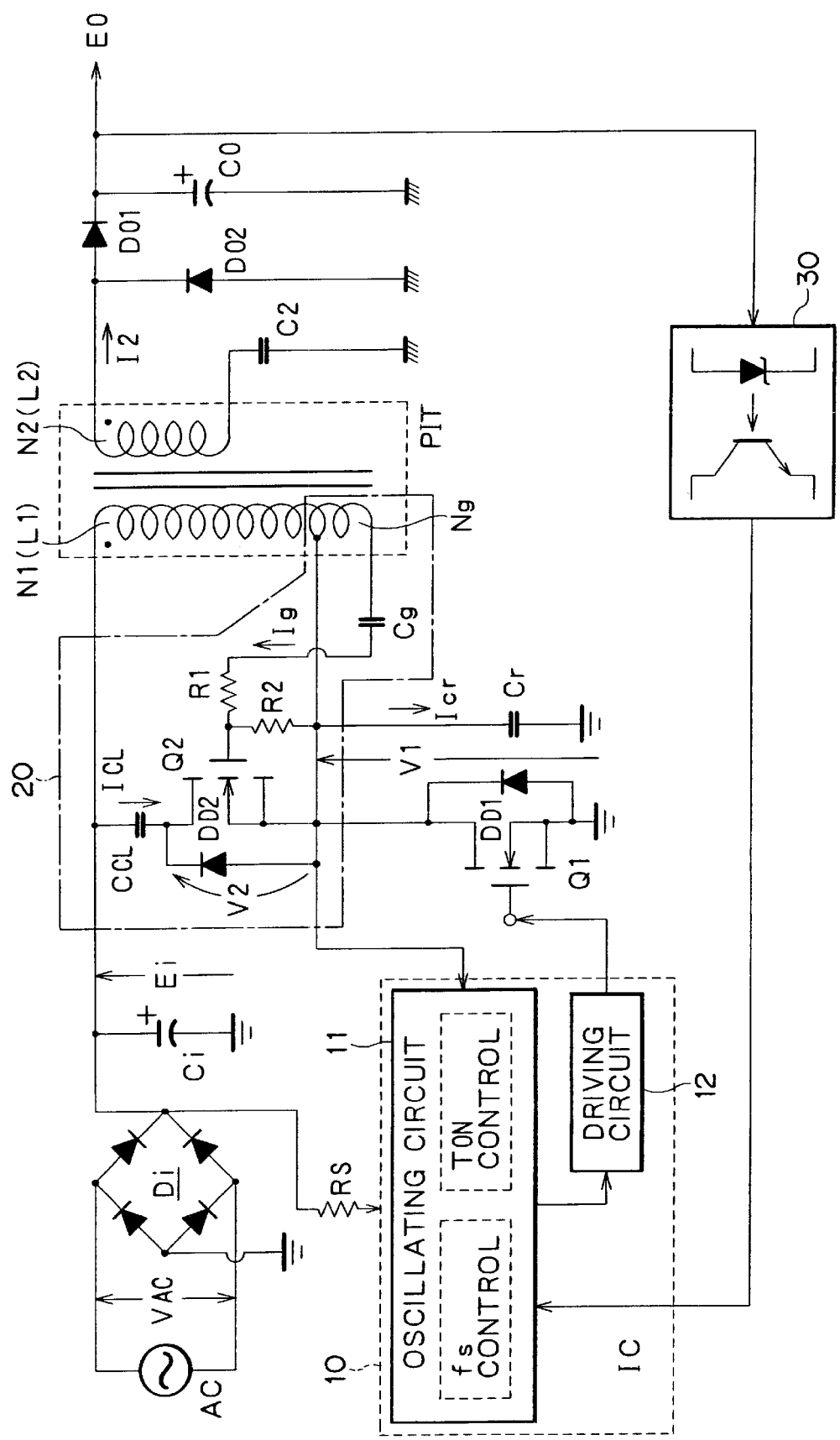
FIG. 3 is a circuit configuration diagram of a switching power supply circuit according to a second embodiment of the present invention.
Figure 4:
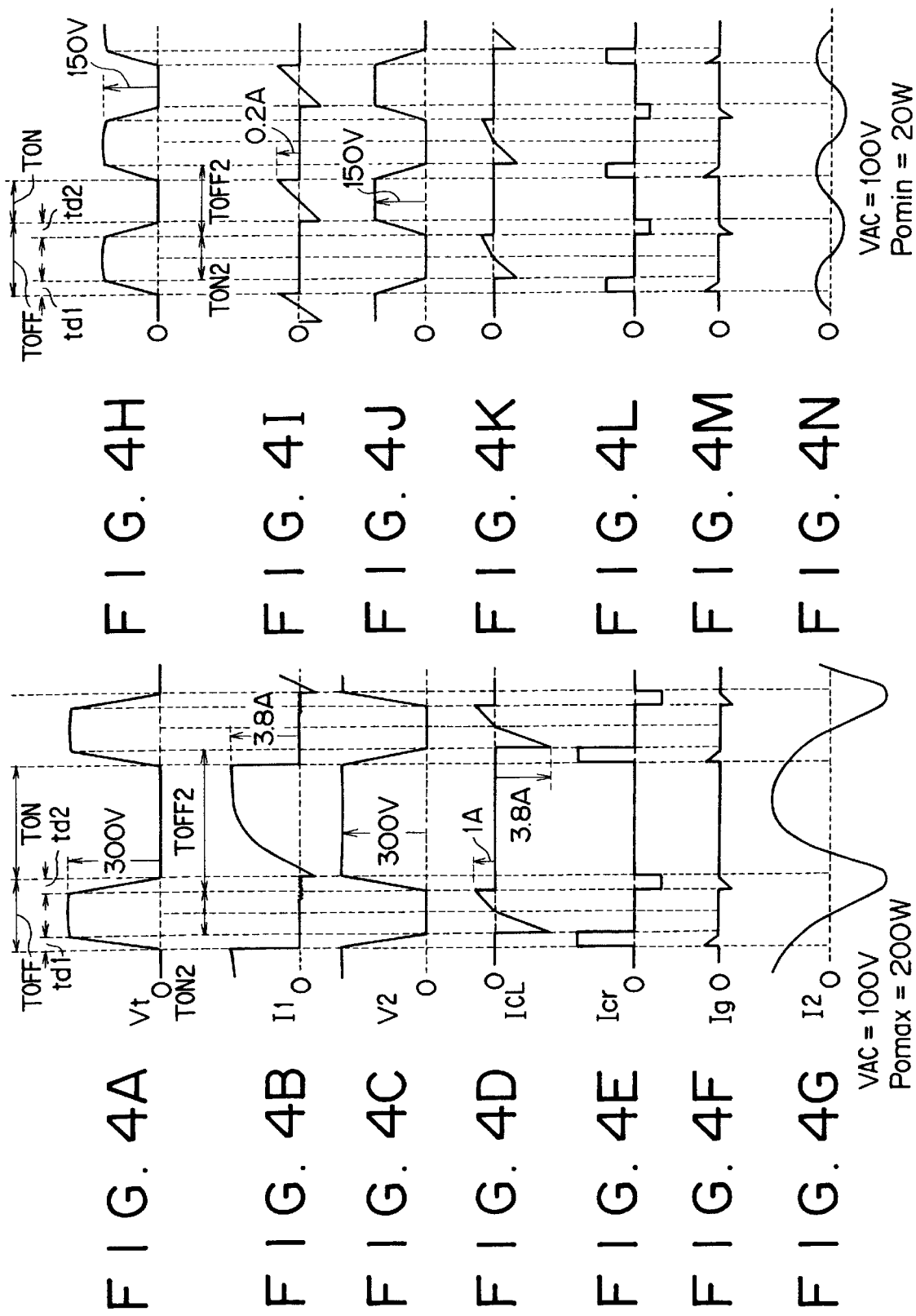
FIGS. 4A, 4B, 4C, 4D, 4E, 4F, 4G, 4H, 4I, 4J, 4K, 4L, 4M, and 4N are waveform diagrams showing operations of main parts in the switching power supply circuit of FIG. 3.

FIG. 1 is a circuit configuration diagram of a power supply circuit according to a first embodiment of the present invention, and FIG. 3 is a circuit configuration diagram of a power supply circuit according to a second embodiment of the present invention. As in FIGS. 9 and 10, each of the power supply circuits shown in the figures is a complex resonance type switching converter provided with a voltage resonance type converter on the primary side and a resonant circuit on the secondary side. Therefore in this case, the power supply circuits each have an isolating converter transformer PIT configured as shown in FIG. 11. The same is true for power supply circuits according to other embodiments to be described later.

The general primary-side configuration of the power supply circuit of FIG. 1 or FIG. 3 includes a voltage resonance type converter that has a main switching device Q1 and basically performs single-ended switching operation by being externally excited. In addition, the power supply circuit has an active clamp circuit 20 for clamping a parallel resonance voltage V1 across a parallel resonant capacitor Cr, which will be described later. In this case, a MOS-FET is used as the main switching device Q1 and as an auxiliary switching device Q2.

A switching driver 10 according to the first and second embodiments is the same as in FIG. 9, for example, and specifically has an oscillating circuit 11 and a driving circuit 12. The oscillating circuit 11 generates an oscillating signal by changing its oscillating frequency according to change in a secondary-side direct-current output voltage E0 and changing duty ratio of its waveform within one switching cycle according to pulse level of the primary-side parallel resonance voltage V1, and then outputs the thus generated oscillating signal to the driving circuit 12 to drive the main switching device Q1. Thus, switching frequency of the main switching device Q1 is changed according to variation in load and variation in the alternating input voltage, and at the same time, its on/off period within one switching cycle is changed.

In the first and second embodiments, in particular, since an auxiliary switching device Q2 of the active clamp circuit 20 is driven by a self-oscillation driving circuit that includes a driving winding Ng wound in the isolating converter transformer PIT, not only the on period of the main switching device Q1 within one switching cycle but also its off period is variably controlled. Therefore, in the first and second embodiments, control for constant voltage by the complex control method is effected by changing three parameters: the switching frequency of the main switching device Q1, and the on period and the off period within one switching cycle of the main switching device Q1.

The active clamp circuit 20 in this case is formed with the auxiliary switching device Q2, a clamp capacitor CCL, and a clamp diode DD2. A so-called body diode, for example, is selected for the clamp diode DD2. A driving circuit system for driving the auxiliary switching device Q2 comprises the driving winding Ng, a capacitor Cg, and resistances R1 and R2.

The clamp diode DD2 is connected in parallel with a drain and source of the auxiliary switching device Q2. In this case, an anode of the clamp diode DD2 is connected to the source of the auxiliary switching device Q2, while a cathode of the clamp diode DD2 is connected to the drain of the auxiliary switching device Q2. The drain of the auxiliary switching device Q2 is connected to one terminal of the clamp capacitor CCL, whereas the other terminal of the clamp capacitor CCL is connected to a node that connects a line of rectified and smoothed voltage Ei with a starting point of a primary winding N1. The source of the auxiliary switching device Q2 is connected to a n ending point of the primary winding N1. Thus, the active clamp circuit 20 in the first and second embodiments is formed by connecting the clamp capacitor CCL in series with a parallel connection circuit of the auxiliary switching device Q2 and the clamp diode DD2. The circuit thus formed is connected in parallel with the primary winding N1 of the isolating converter transformer PIT.

As shown in the figures, a series connection circuit of the resistance R1, the capacitor Cg, and the driving winding Ng included in the driving circuit system for driving the auxiliary switching device Q2 is connected to a gate of the auxiliary switching device Q2. The series connection circuit forms the self-oscillation driving circuit for driving the auxiliary switching device Q2. The driving winding Ng is formed by winding a wire on the ending point side of the primary winding N1 of the isolating converter transformer PIT, and the number of turns in this case is 1T (turn), for example. Thus, a voltage induced by an alternating voltage obtained in the primary winding N1 occurs in the driving winding Ng. In this case, because of relation between their winding directions, the voltage obtained in the driving winding Ng is of opposite polarity from that of the primary winding N1. It is to be noted that when the number of turns of the driving winding Ng is 1T, operation of the driving winding Ng is insured in practice; however, the number of turns is not limited to 1T.

The resistance R2 is inserted between nodes of the primary winding N1 of the isolating converter transformer PIT and the driving winding Ng.

As shown in FIG. 1, the power supply circuit is provided on the secondary side with a secondary-side parallel resonant circuit formed by a secondary winding N2 and a secondary-side resonant capacitor C2, and a half-wave rectifier circuit formed by a rectifier diode D0 and a smoothing capacitor C0 that is connected to a starting point side of the secondary winding N2. Alternatively, as shown in FIG. 3, the power supply circuit is provided on the secondary side with a secondary-side series resonant circuit formed by a secondary winding N2 and a secondary-side series resonant capacitor C2, and a voltage doubler half-wave rectifier circuit formed by a set of rectifier diodes D01 and D02 and a smoothing capacitor C0. Either one of the half-wave rectifier circuits provides a secondary-side direct-current output voltage E0.

Figure 2:
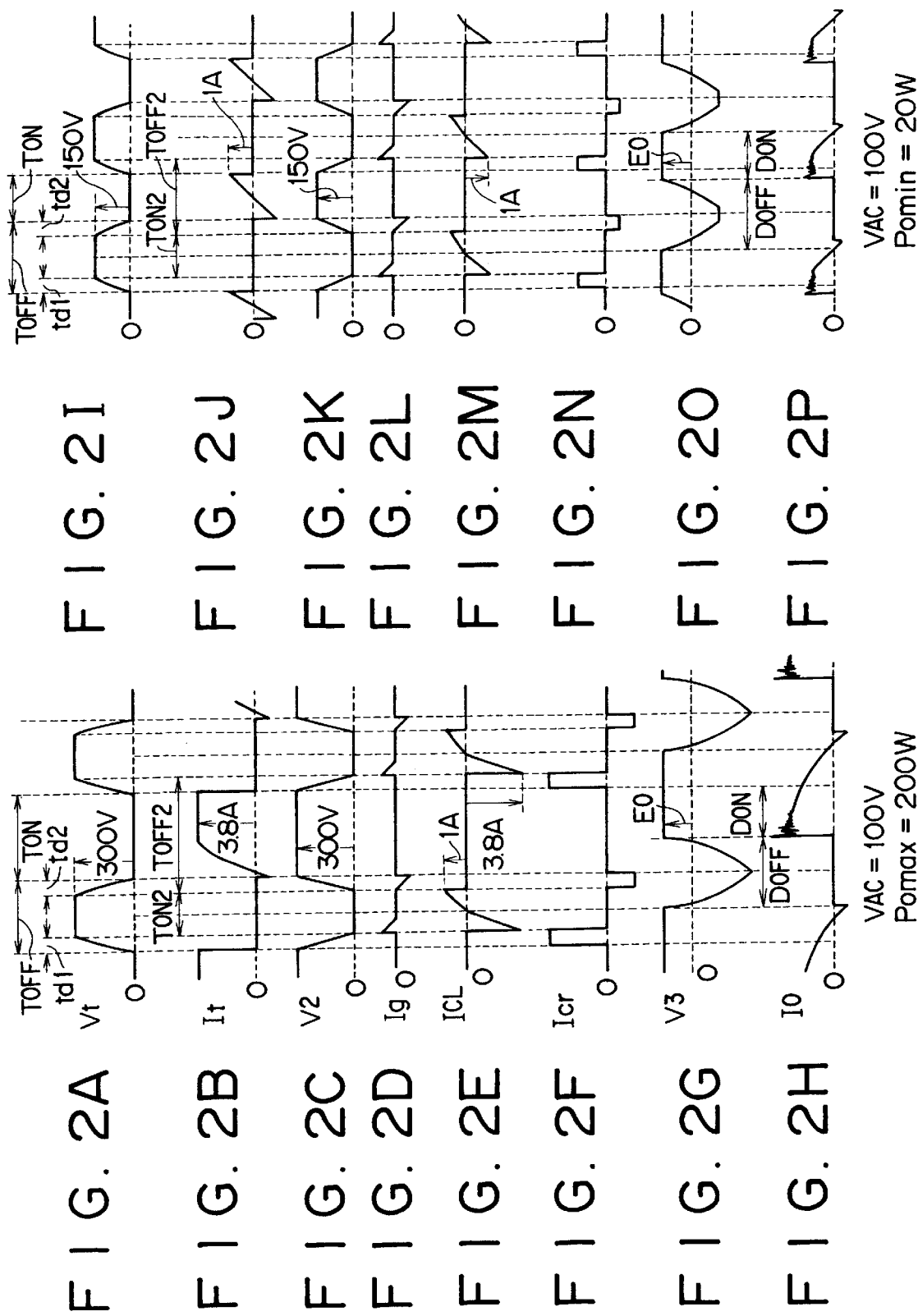
FIGS. 2A, 2B, 2C, 2D, 2E, 2F, 2G, 2H, 2I, 2J, 2K, 2L, 2M, 2N, 2O, and 2P are waveform diagrams showing operations of main parts in the switching power supply circuit of FIG. 1.

FIGS. 2A, 2B, 2C, 2D, 2E, 2F, 2G, 2H, 2I, 2J, 2K, 2L, 2M, 2N, 2O, and 2P are waveform diagrams primarily showing switching operation on the primary side of the power supply circuit of FIG. 1. Specifically, the figures show operation of the voltage resonance type converter provided with the active clamp circuit 20. The operations shown in FIGS. 2A to 2P are obtained when the circuit of FIG. 1 is configured for AC 100 V. FIGS. 2A to 2H show operations of parts in the circuit under conditions of an alternating input voltage VAC=100 V and a maximum load power Pomax=200 W. FIGS. 2I to 2P show operations of the same parts as those of FIGS. 2A to 2H respectively under conditions of an alternating input voltage VAC=100 V and a minimum load power Pomin=20 W.

First, the operations at the maximum load power Pomax=200 W shown in FIGS. 2A to 2H will be described.

The main switching device Q1 is controlled to be turned on during a period TON, and the auxiliary switching device Q2 is controlled so as to remain in an off state during the period TON.

As shown by a waveform in FIG. 2B, a switching output current I1 flows through the drain of the main switching device Q1 during the period TON. The switching output current I1 flows to the main switching device Q1 via leakage inductance L1 of the primary winding N1 of the isolating converter transformer PIT. The switching output current I1 in this period has a waveform that is initially reversed from a negative direction to a positive direction, as shown in the period TON in FIG. 2B. During the period when the switching output current I1 flows in a negative direction, the clamp diode DD1 conducts and switching output current IQ1 flows through the clamp diode DD1 and the primary winding N1 after the parallel resonant capacitor Cr finishes discharging electricity at the end of an immediately preceding period td2.

In timing in which the switching output current I1 is reversed from a negative direction to a positive direction as shown in FIG. 2B, the main switching device Q1 is turned on by ZVS (Zero Volt Switching) and ZCS (Zero Current Switching).

During a next period td1, the main switching device Q1 is turned off, whereby the current that has been flowing through the primary winding N1 flows to the parallel resonant capacitor Cr. As shown in FIG. 2F, the current Icr flowing through the parallel resonant capacitor Cr during this period exhibits a pulse-shaped waveform of positive polarity. This represents an operation in partial resonance mode. During this period, since the parallel resonant capacitor Cr is connected in parallel with the main switching device Q1, the main switching device Q1 is turned off by ZVS.

During a next period, the auxiliary switching device Q2 is controlled so as to be in an on state, and the main switching device Q1 is controlled so as to be in an off state. This period corresponds to a period TON2 during which a voltage V2 across the auxiliary switching device Q2 shown in FIG. 2C is at a zero level.

The period TON2 is a period of operation of the active clamp circuit 20, in which the active clamp circuit performs the following operation.

The parallel resonant capacitor Cr is charged with the current flowing from the primary winding N1, whereby a voltage obtained at the primary winding N1 is at the same potential as or higher than the level of voltage across a clamp capacitor CCL1 at the start of the period TON2.

Thus, conditions for conduction of the clamp diode DD2 connected in parallel with the auxiliary switching device Q2 are satisfied and thereby the clamp diode DD2 conducts. Then a current flows through a path from the clamp diode DD2 to the clamp capacitor CCL1, and the clamp current ICL provides a sawtooth waveform that approaches a zero level from a negative direction as time passes after the start of the period TON2 as shown in FIG. 2E.

When capacitance of the clamp capacitor CCL1 is selected to be 50 times or more that of the parallel resonant capacitor Cr, for example, most of the current flows to the clamp capacitor CCL1 as the clamp current ICL, and little current flows to the parallel resonant capacitor Cr.

Thus, during the period TON2, the gradient of the resonance voltage V1 applied to the main switching device Q1 is gentle, and thus a clamping operation on the parallel resonance voltage V1 is obtained. Therefore, while the resonance voltage V1 in the prior art circuits of FIGS. 9 and 10 has a level of 550 V, the resonance voltage V1 in the first and second embodiments is suppressed to 300 V.

Then, the clamp current ICL shown in FIG. 2E is reversed from a negative direction to a positive direction. The auxiliary switching device Q2 is turned on by ZVS and ZCS in timed relation to the reversal of the clamp current ICL from a negative direction to a positive direction.

In the on state of the auxiliary switching device Q2, due to resonance effect of the primary-side parallel resonant circuit obtained in this state, the clamp current ICL flows through the primary winding N1 and the clamp capacitor CCL, and then from the drain to the source of the auxiliary switching device Q2 while forming a waveform that increases in a positive direction as shown in FIG. 2E.

Though not shown, a voltage applied to the gate of the auxiliary switching device Q2 is the voltage induced in the driving winding Ng, and forms a rectangular pulse waveform.

A gate inflow current Ig flowing through the gate of the auxiliary switching device Q2 is made to flow so as to form a differential waveform as shown in FIG. 2D immediately after the end of the period td1 and during the period td2 by a differentiating circuit formed by the capacitor Cg and the resistance R2. The periods td1 and td2 are threshold periods during which both the main switching device Q1 and the auxiliary switching device Q2 are turned off; the threshold periods are retained by the flowing of the gate inflow current Ig.

A period TOFF is ended when the voltage V2 across the auxiliary switching device Q2, which has been at a zero level during the period TOFF because the auxiliary switching device Q2 has been turned on, begins to rise. Then, the parallel resonant capacitor Cr discharges a current into the primary winding N1. This represents a partial resonance operation. The gradient of the parallel resonance voltage V1 applied to the main switching device Q1 in this period is steep because of the small capacitance of the parallel resonant capacitor Cr. Thus, as shown in FIG. 2A, the parallel resonance voltage V1 falls rapidly to a zero level.

Then, the turning-off of the auxiliary switching device Q2 begins. In this case, since the parallel resonance voltage V1 falls with a certain gradient, the auxiliary switching device Q2 is turned off by ZVS.

A voltage generated by turning off the auxiliary switching device Q2 does not rise steeply because of the discharge of the parallel resonant capacitor Cr. This operation is for example shown in FIG. 2C as the voltage V2 across the auxiliary switching device Q2, which voltage has a waveform that makes a transition from a zero level to a peak level with a certain gradient in the period td2.

The voltage V2 across the auxiliary switching device Q2 has a level of 300 V for example during a period TOFF2 during which the auxiliary switching device Q2 is turned off, then makes a transition from 300 V to a zero level during the period td1, which is a starting period of the period TOFF2, and, as described above, makes a transition from the zero level to 300 V during the period td2, which is an ending period of the period TOFF2. Thereafter, the operation described above is repeated for each switching cycle.

As operation on the secondary side, FIG. 2G shows a secondary-side alternating voltage V3 across the secondary-side parallel or series resonant capacitor C2, and FIG. 2H shows a secondary-side rectified current Io flowing in the secondary-side rectifier diode D0.

The secondary-side alternating voltage V3 is clamped at the level of the secondary-side direct-current voltage E0 during a period D0N during which the secondary-side rectifier diode D01 conducts and therefore is in an on state, and shows a sinusoidal waveform that has a peak in a direction of negative polarity during a period D0FF during which the secondary-side rectifier diode D01 is in an off state.

The secondary-side rectified current I0 is at a zero level during the period D0FF, and flows in a manner shown by a waveform in FIG. 2H during the period D0N.

Under conditions where the load power is decreased to the minimum load power Pomin=20 W, for example, the operating waveforms of the parts shown in FIGS. 2A to 2H are changed in a manner shown in FIGS. 2I to 2P, respectively.

For example, a comparison of the primary-side parallel resonance voltages V1 in FIGS. 2A and 2I indicates that a waveform shown in FIG. 2I has a noticeably shorter period TON, during which the main switching device Q1 is turned on, as compared with FIG. 2A. Thus, the switching frequency of FIG. 2I is higher than that of FIG. 2A at the maximum load power. It is to be noted that the period TOFF during which the main switching device Q1 is turned off is actually slightly changed.

This indicates that the main switching device Q1 on the primary side is controlled so as to raise its switching frequency as the load power is decreased and the secondary-side output voltage E0 is raised, and that at the same time, the on/off period within one switching cycle of the main switching device Q1 is variably controlled. Thus, an operation for constant voltage by the complex control method that variably controls the three parameters mentioned above: the switching frequency fs, the period TON, and the period TOFF is indicated.

The auxiliary switching device Q2, on the other hand, is driven in timing in accordance with the waveform of the voltage obtained in the driving winding Ng. The voltage obtained in the driving winding Ng is induced by the alternating voltage occurring in the primary winding N1. Accordingly, in synchronism with the switching operation of the main switching device Q1 controlled in a manner described above, the on period TON2 and the off period TOFF2 of the auxiliary switching device Q2 are changed. Thus, the switching frequency of the auxiliary switching device Q2 is also variably controlled.

More specifically, according to the first and second embodiments, even though the auxiliary switching device Q2 is driven by the self-oscillation system, the on/off period of the auxiliary switching device Q2 is also variably controlled according as the on/off period of the main switching device Q1 is changed. This is because the level of the voltage for driving the auxiliary switching device Q2 is varied as the voltage induced in the driving winding Ng is changed according to load variation and variation in the rectified and smoothed voltage Ei.

Even under the conditions of such a light load, operations in modes 1 to 5 performed in timing shown in FIGS. 2I to 2P suppress the peak level of the primary-side parallel resonance voltage V1, and also suppress the peak level of the voltage V2 across the auxiliary switching device Q2 to about 240 V, for example. The primary-side parallel resonance voltage V1 in particular is suppressed to 150 V at the minimum load power.

Values selected for main components in the power supply circuit of FIG. 1 when obtaining experimental results as shown in FIGS. 2A to 2P are shown in the following for reference.

First, a product having a low on resistance of 400 V/10 A is selected for the main switching device Q1, and a product having a low on resistance of 400 V/3 A is selected for the auxiliary switching device Q2.

The following values are selected for the other components.

Parallel resonant capacitor Cr=3300 pF
Clamp capacitor CCL=0.1 $\mu$F
Secondary-side parallel resonant capacitor C2=0.01 $\mu$F
Primary winding N1=secondary winding N2=43 T
Capacitor Cg=0.33 $\mu$F
Resistance R1=22 $\Omega$
Resistance R2=100 $\Omega$ The range of the variable switching frequency fs to be set when these components are selected is 100 KHz to 150 KHz, for example.

As characteristics of the power supply circuit of FIG. 1, FIG. 5 shows relations of power conversion efficiency $\eta$ DC→DC, the switching frequency fs and the periods TON and TOFF of the main switching device Q1 with respect to load power Po. The characteristics shown in the figure are obtained under conditions of AC 200 V, and therefore are measured under conditions of a constant rectified and smoothed voltage Ei=250 V.

As shown in the figure, PWM control is effected such that the period TON during which the main switching device Q1 is turned on is lengthened as the load power becomes heavier, and at the same time, the period TOFF during which the main switching device Q1 is turned off is also lengthened though in smaller degrees than the period TON. In addition, at the same time, the switching frequency fs is controlled to decrease.

As shown in the figure, while the primary-side parallel resonance voltage V1 is somewhat increased as the load becomes heavier, the parallel resonance voltage V1 is suppressed to a region of 600 V.

Results obtained show that the power conversion efficiency is about 92 percent at a light load such as a load power Po=50 W, while a power conversion efficiency of 94 percent or more is retained at a load power Po=100 W or more.

As characteristics of the power supply circuit of FIG. 1, FIG. 6 shows relations of power conversion efficiency η DC→DC, the switching frequency fs and the periods TON and TOFF of the main switching device Q1 with respect to direct-current input voltage. The characteristics shown in the figure are obtained under conditions of a load power Po=200 W.

In this case, the period TON during which the main switching device Q1 is turned on is controlled to be shortened as the rectified and smoothed voltage Ei is raised, and at the same time, the period TOFF during which the main switching device Q1 is turned off is lengthened with a gentle gradient. In addition, overall, the switching frequency fs is controlled to rise as the rectified and smoothed voltage Ei is raised.

While the primary-side parallel resonance voltage V1 is increased as the rectified and smoothed voltage Ei is raised, the parallel resonance voltage V1 is suppressed to V1=800 V or less even at Ei=400 V, for example.

A power conversion efficiency of 94 percent or more is retained irrespective of change in the rectified and smoothed voltage Ei.

As is understood from the description made so far that the circuit shown in FIG. 1 clamps the parallel resonance voltage V1 generated during the off period of the main switching device Q1 to suppress its level. In addition, even when AC 100 V rises to about VAC=144 V under conditions of the maximum load for example, the parallel resonance voltage V1 can be suppressed to about 300 V. Even in the case of AC 200 V, it is possible to suppress the maximum value of peak level of the parallel resonance voltage V1 to about 600 V in normal operation. Thus, as the main switching device Q1 of the circuit shown in FIG. 1, a product having a withstand voltage of 400 V may be selected for AC 100 V, and a product having a withstand voltage of 800 V may be selected for AC 200 V. It is therefore possible to use a product having a lower withstand voltage than those of the circuits shown in FIGS. 9 and 10. In addition, a product having an equally low withstand voltage may be used for the auxiliary switching device Q2.

Thus, characteristics of the switching devices of the circuit shown in FIG. 1 are improved over those of the circuits shown in FIGS. 9 and 10. For example, when the switching device is a MOS-FET, its on resistance is reduced, thereby resulting in an improvement in power conversion efficiency. For example, experimental results obtained show that the power conversion efficiency in the circuits of FIGS. 9 and 10 is 92%, whereas the power conversion efficiency in the circuit of FIG. 1 is 93% (at an alternating input voltage VAC=100 V).

Furthermore, the first and second embodiments perform an operation by the complex control method that variably controls the three parameters mentioned above: the switching frequency fs, the on period, and the off period of the switching device, thereby extending a range of control for constant voltage.

Moreover, since a product having a low withstand voltage is selected for the switching device, the switching device can be miniaturized. For example, products having a withstand voltage of 1000 V or higher are required as the switching devices for use in the circuits of FIGS. 9 and 10, thus resulting in relatively large package size. On the other hand, smaller package products may be used as the switching devices Q1 and Q2 in the circuit of FIG. 1.

Furthermore, since the level of the parallel resonance voltage V1 is suppressed, a product having a lower withstand voltage than those of the circuits of FIGS. 9 and 10 may be employed as the parallel resonant capacitor Cr in the circuit of FIG. 1. Thus, the parallel resonant capacitor Cr can also be miniaturized.

Since the power supply circuit shown in FIG. 1 variably controls the switching frequency of the primary-side switching converter according to variation in load power, the power supply circuit operates so as to lower the switching frequency when a short circuit in the load occurs.

For example, the circuits of FIGS. 9 and 10 lower the switching frequency and thereby lengthen the on period of the switching device when a short circuit in the load occurs, and accordingly the voltage applied to the switching device and the parallel resonant capacitor is increased. Thus, the power supply circuits need to be provided with a protection circuit for protecting the switching device by limiting a high level of voltage and current generated at the time of the short circuit in the load.

On the other hand, the power supply circuits according to the first and second embodiments change the parallel resonance voltage V1 only in small degrees according to load variation, and therefore the rise of the parallel resonance voltage V1 is controlled even when the switching frequency is lowered at the time of the short circuit in the load. It is thereby possible to omit a protection circuit to deal with the short circuit in the load.

The first and second embodiments are particularly characterized by including the self-oscillation driving circuit system comprising the driving winding Ng, the capacitor Cg, and the resistances R1 and R2 for driving the auxiliary switching device Q2 in the active clamp circuit 20 for switching operation.

As another arrangement for driving the auxiliary switching device Q2 for switching operation, an external oscillation driving circuit system for driving the auxiliary switching device Q2 by complex control may be additionally provided in the switching driver 10. Specifically, both the main switching device Q1 and the auxiliary switching device Q2 are driven by a circuit such as an externally oscillating IC. However, with such an arrangement, it is necessary to provide both an external oscillation circuit system for simultaneously effecting switching frequency control and PWM control of the main switching device Q1 and an external oscillation circuit system for simultaneously effecting switching frequency control and PWM control of the auxiliary switching device Q2. Consequently, the circuit configuration becomes more complex and also the number of parts is increased, thus hindering miniaturization of the power supply circuit.

On the other hand, with the arrangement according to the first and second embodiments as described above, the circuit system for driving the auxiliary switching device Q2 has a very simple circuit configuration including the winding of only 1T wound in the isolating converter transformer PIT, the two resistances, and the single capacitor, and realizes the same operation as the external oscillation driving circuit system does.

FIG. 7 is a circuit configuration diagram of a power supply circuit according to a third embodiment of the present invention, and FIG. 8 is a circuit configuration diagram of a power supply circuit according to a fourth embodiment of the present invention. In the figure, the same parts as in FIG. 1 are identified by the same reference numerals, and their description will be omitted.

As shown in FIGS. 7 and 8, an IGBT (Insulated Gate Bipolar Transistor) is selected as a main switching device Q1 and as an auxiliary switching device Q2 on the primary side of the power supply circuit. Otherwise, the configuration on the primary side is the same as that of the circuit shown in FIG. 1.

With such a configuration, it is possible to obtain the same effects as those of the circuit shown in FIG. 1, and also to obtain a higher power conversion efficiency, for example, by selecting the IGBT.

On the secondary side of the power supply circuit shown in the figure, two rectifier diodes D01 and D02 and two smoothing capacitors C01 and C02 are connected to a secondary-side parallel resonant circuit in a manner shown in the figure to thereby form a voltage doubler rectifier circuit. Thus, a voltage obtained between a positive terminal of the smoothing capacitor C01 and a secondary-side ground, that is, a secondary-side direct-current voltage E0 has a level twice that of an alternating voltage obtained in a secondary winding N2. Therefore, in cases where a voltage level equal to that obtained when connecting a normal equal-voltage rectifier circuit suffices as the level of the secondary-side direct-current voltage E0, the number of turns of the secondary winding N2 may be reduced to ½, thereby making it possible to miniaturize the isolating converter transformer PIT as much, for example.

The resonant circuit on the secondary side is not limited to the configurations shown in the figures, a secondary-side series resonant circuit as in FIG. 3 may be employed.

It is to be noted that embodiments of the present invention are not limited to the configurations shown in the drawings. For example, in the embodiments described above, MOS-FETs, BJTs (Bipolar Junction Transistors) or IGBTs are used as the main switching device and the auxiliary switching device; however, other devices such as SITs (Static Induction Thyristors) may also be employed. Also, configuration of the switching driver for driving the main switching device Q1 by external oscillation does not need to be limited to those shown in the drawings; it may be modified into an appropriate circuit configuration as required. In addition, the rectifier circuit on the secondary side including the secondary-side resonant circuit is not limited to the configurations shown in the drawings as embodiments of the present invention; the rectifier circuit may employ different circuit configurations.

What is claimed is:

1. A switching power supply circuit comprising:

switching means showing a main switching device for interrupting an inputted direct-current input voltage;

a primary-side parallel resonant capacitor for forming a primary-side parallel resonant circuit that converts operation of said switching means into a voltage resonance type operation;

an isolating converter transformer having a primary-side winding and a secondary-side winding for transmitting an output of said switching means obtained in said primary-side winding to said secondary-side winding, said primary-side winding and said secondary-side winding being wound so as to be loosely coupled to each other with a predetermined coupling coefficient;

a secondary-side resonant circuit formed by connecting a secondary-side resonant capacitor to said secondary-side winding;

direct-current output voltage generating means for rectifying an alternating voltage inputted from said secondary-side winding and thereby providing a direct-current output voltage;

active clamp means for clamping a primary-side parallel resonance voltage generated across said primary-side parallel resonant capacitor during an off period of said main switching device, said active clamp means including an auxiliary switching device driven for switching operation by self-oscillation driving; and switching driving means for effecting control for constant voltage by driving said main switching device for said switching operation such that a switching frequency of said main switching device is variably controlled according to level of said direct-current output voltage, and concurrently, an on/off period of said main switching device within one switching cycle is changed.

2. The switching power supply circuit claimed in claim 1, wherein said auxiliary switching device is driven by a self-oscillation switching output obtained in a driving winding formed by winding a wire of said primary-side winding.

3. The switching power supply circuit claimed in claim 1, wherein said resonant circuit is formed by connecting said secondary-side resonant capacitor in one of in series and in parallel with said secondary-side winding.

4. The switching power supply circuit claimed in claim 1, wherein said auxiliary switching device is formed by a MOS-FET or an insulated gate bipolar transistor (IGBT).

* * * * *